US012292970B2

(12) United States Patent
Croteau et al.

(10) Patent No.: US 12,292,970 B2
(45) Date of Patent: May 6, 2025

(54) SYSTEM AND METHOD FOR AUTOMATED SENSITIVE INFORMATION DISCOVERY, MONITORING AND REMEDIATION

(71) Applicant: GROUPE ELUCIDIA INC., Quebec (CA)

(72) Inventors: David Croteau, St-Romauld (CA); Nicolas Berthiaume, Lac-Beauport (CA); Jordan Bourgault, Quebec (CA); Michael Fortin, St-Aubert (CA)

(73) Assignee: Groupe Elucidia Inc., Quebec (CA)

( * ) Notice: Subject to any disclaimer, the term of this patent is extended or adjusted under 35 U.S.C. 154(b) by 125 days.

(21) Appl. No.: 17/907,212

(22) PCT Filed: Mar. 26, 2021

(86) PCT No.: PCT/CA2021/050400
§ 371 (c)(1),
(2) Date: Sep. 23, 2022

(87) PCT Pub. No.: WO2021/189152
PCT Pub. Date: Sep. 30, 2021

(65) Prior Publication Data
US 2023/0153427 A1    May 18, 2023

Related U.S. Application Data

(60) Provisional application No. 63/000,238, filed on Mar. 26, 2020.

(51) Int. Cl.
*G06F 21/55* (2013.01)
*G06F 21/62* (2013.01)
*H04L 9/40* (2022.01)

(52) U.S. Cl.
CPC ........ *G06F 21/554* (2013.01); *G06F 21/6245* (2013.01); *H04L 63/00* (2013.01); *H04L 63/10* (2013.01); *H04L 63/14* (2013.01)

(58) Field of Classification Search
CPC .... G06F 21/554; G06F 21/6245; G06F 21/55; G06F 21/62; H04L 63/00; H04L 63/10; H04L 63/14
See application file for complete search history.

(56) References Cited

U.S. PATENT DOCUMENTS 7,933,989 B1    4/2011  Barker et al.
8,307,427 B1   11/2012  Wisilosky et al.
(Continued)

OTHER PUBLICATIONS

Alzhrani, Khudran, Rudd, Ethan M., Boult, Terrance E., et al. Automated big text security classification. In : 2016 IEEE Conference on Intelligence and Security Informatics (ISI). IEEE, 2016. p. 103-108.

(Continued)

*Primary Examiner* — Kaveh Abrishamkar
*Assistant Examiner* — Howard H. Louie
(74) *Attorney, Agent, or Firm* — Simpson & Simpson, PLLC

(57) ABSTRACT

A system for automated sensitive information discovery, monitoring, and remediation using an agent associated to a data source and including: a module detecting the occurrence of events indicative of access to data; an module identifying the events classified as potentially threatening; a module extracting data associated to each potentially threatening event; and a module performing data analysis of the extracted data and determining a sensitivity score for the data to file associated to the potentially threatening event. The system also comprises a central platform in data communication with the agent and including: a module analyzing data received from the agent and identifying a potential security risk relative to one of a user or group of users associated to the data source, the data source, a specific file or a specific data type stored on the data source; and a (Continued)

control module triggering remediation actions upon detection of a security risk.

20 Claims, 4 Drawing Sheets

(56) References Cited

U.S. PATENT DOCUMENTS

| | | |
|---|---|---|
| 8,677,448 B1 | 3/2014 | Kauffman et al. |
| 9,235,562 B1 | 1/2016 | Hart |
| 9,275,065 B1 | 3/2016 | Ganesh et al. |
| 9,276,862 B1* | 3/2016 | Presta .................. H04M 15/56 |
| 9,349,016 B1 | 5/2016 | Brisebois et al. |
| 9,691,027 B1 | 6/2017 | Sawant et al. |
| 9,807,094 B1 | 10/2017 | Liu et al. |
| 10,257,217 B2 | 4/2019 | Hamdi |
| 10,320,830 B2 | 6/2019 | Ahuja et al. |
| 10,354,187 B2 | 7/2019 | Kasravi et al. |
| 10,375,116 B2 | 8/2019 | Cheng et al. |
| 2007/0067853 A1 | 3/2007 | Ramsey |
| 2011/0225650 A1 | 9/2011 | Margolies et al. |
| 2012/0303558 A1 | 11/2012 | Jaiswal |
| 2013/0333040 A1* | 12/2013 | Diehl .................. H04L 41/0803 726/22 |
| 2014/0279641 A1 | 9/2014 | Sinngh et al. |
| 2015/0074756 A1* | 3/2015 | Deng .................. H04L 63/1433 726/1 |
| 2015/0154420 A1 | 6/2015 | Wu et al. |
| 2015/0326601 A1* | 11/2015 | Grondin .............. H04L 63/1433 726/25 |
| 2016/0292445 A1 | 10/2016 | Lindemann |
| 2017/0083517 A1 | 3/2017 | Mitkar et al. |
| 2017/0149737 A1* | 5/2017 | Betzler ................. H04W 12/02 |
| 2017/0287028 A1 | 10/2017 | Barday |
| 2018/0191759 A1 | 7/2018 | Baijal et al. |
| 2018/0204021 A1 | 7/2018 | Long |
| 2019/0138727 A1* | 5/2019 | Dontov .............. G06F 11/1464 |
| 2019/0180049 A1 | 6/2019 | LeCour |
| 2021/0194888 A1* | 6/2021 | Bhaskar S .......... G06F 16/3347 |

OTHER PUBLICATIONS

Park, Youngja, Teiken, Wilfried, Rao, Josyula R., et al. Data classification and sensitivity estimation for critical asset discovery. IBM Journal of Research and Development, 2016, vol. 60, No. 4, p. 2: 1-2: 12.

* cited by examiner

SYSTEM AND METHOD FOR AUTOMATED SENSITIVE INFORMATION DISCOVERY, MONITORING AND REMEDIATION

CROSS-REFERENCE TO RELATED APPLICATIONS

This application claims priority under 35 USC§ 119(e) of U.S. provisional patent application 63/000,238 filed on Mar. 26, 2020, the specification of which being hereby incorporated by reference.

TECHNICAL FIELD OF THE INVENTION

The present invention relates to the field of sensitive data monitoring and remediation. More particularly, it relates to a system and a method for performing automated and constant monitoring of data sources and quantifying of the sensitivity of the data held thereon to detect potentially risky occurrences and perform remediation action, when necessary.

BACKGROUND

Background protection of sensitive data, such as personal data, financial data, confidential data, or the like is a constant concern for any organization handling (i.e. obtaining, accessing, managing, storing, etc.) such information. Indeed, when sensitive data is handled by an organization, adequate security measures must be put in place to prevent malicious external intrusions which could lead to data leaks.

One other major concern is internal data leaks, which for example can result from authorized users logging into a computer network where sensitive data is accessible, legally accessing the sensitive data (for example in the course of their employment) and taking advantage of their authorized access to gather sensitive data, which can later be leaked to external sources. In a lot of cases, internal data leaks can also be the result of authorized users gathering unnecessary amounts of sensitive data by inadvertence, or through social engineering where an authorized user is manipulated (or tricked) into leaking sensitive information that he is authorized to access.

However, known solutions destined to preventing internal data leaks tend to suffer from several drawbacks. Indeed, known solutions tend to presuppose that data custodians or owners have a known inventory of all sensitive information under their responsibility, which in a lot of cases is a false assumption. In addition, known solutions tend to propose an overview with limited background information, therefore making it harder for organizations to assess risk levels associated to sensitive data and to prioritize actions when an unexpected amount of sensitive data is detected in a data source.

In view of the above, there is a need for an improved system and method for automated sensitive information discovery, monitoring and remediation which would be able to overcome or at least minimize some of the above-discussed prior art concerns.

SUMMARY OF THE INVENTION

In accordance with a first general aspect, there is provided a system for automated sensitive information discovery, monitoring, and remediation. The system comprises at least one agent stored in a memory of a computing device operating as a data source or in data communication with the data source. The at least one agent comprises: a data source monitoring module monitoring activity of the data source and detecting the occurrence of events indicative of access to data using the data source or stored on the data source; an event filtering module filtering the events detected by the data source monitoring module and identifying the events classified as potentially threatening events regarding sensitive information stored on the data source or accessed using the data source; a data extraction module performing data extraction of one of data and a file associated to each one of the events classified as potentially threatening events and generating extracted data therefrom; and a file analysis module performing data analysis of the extracted data associated to each one of events classified as potentially threatening events and determining a sensitivity score indicative of a level of sensitivity thereof. The system also comprises a central platform in data communication with the at least one agent. The central platform comprises: a trend recognition module receiving the sensitivity score associated to each one of the events classified as potentially threatening events from the file analysis module, the trend recognition module analyzing the sensitivity score associated to each one of the events classified as potentially threatening events in combination with additional contextual and historical data relative to one of a specific user or group of users associated to the data source, the data source, a specific file type stored on the data source and a specific data type stored on the data source; to identify a potential security risk relative to the one of the specific user or group of users associated to the data source, the data source, the specific file type stored on the data source and the specific data type stored on the data source; and a control module triggering remediation actions relative to the one of the specific user or group of users associated to the data source, the data source, the specific file type stored on the data source and the specific data type stored on the data source, upon detection of a potential security risk.

In an embodiment, the file analysis module is configured to generate metadata regarding the extracted data, the metadata being communicated to the trend recognition module and being used by the trend recognition module to identify the security risk relative to the one of the specific user or group of users associated to the data source, the data source, the specific file type stored on the data source and the specific data type stored on the data source.

In an embodiment, the contextual and historical data includes at least one of events frequencies, a global sensitivity score for the specific user or group of users associated to the data source, a data location, behavioral patterns associated to the one of the specific user or group of users associated to the data source, the data source, the specific file type stored on the data source and the specific data type stored on the data source, a type of changes performed on a file associated to one of the events classified as potentially threatening events, a number of files associated to the specific user or group of users associated to the data source and a data type associated to the to one of the events classified as potentially threatening events.

In an embodiment, the file analysis module is configured to determine the sensitivity score indicative of the level of sensitivity of the extracted data from the one of the data and the file associated to each one of events classified as potentially threatening events using at least one of a comparison of TF-IDF vectors generated for the corresponding data or the files and at least one reference file and a correlation analysis between sensitive information identified with REGEXs and user identifiers.

In an embodiment, the control module of the central platform is configured to determine remediation actions based on predetermined scenarios defining the remediation actions to be taken for specific situations.

In an embodiment, the central platform comprises a display module displaying data relative to the events classified as potentially threatening events and corresponding sensitivity score on a display screen of a computing device.

In an embodiment, the remediation actions include at least one of network access restriction, modification of file access rights, file encryption, user session termination, alert generation and user education recommendations.

In an embodiment, the system includes a configuration module configured to receive parameters regarding one of security protocols, policies and sensitivity parameters of the system, the configuration module generating configuration data defining the parameters of the system as configured therein, the configuration data being transmitted to the at least one agent.

In an embodiment, the event filtering module is configured to perform filtering of the events detected by the data source monitoring module using a set of filtering parameters initially defined using the configuration module.

In an embodiment, the central platform is configured to generate a hash value for each version of each file stored on the data source and the data source monitoring module is configured to use the generated hash value to perform detection of changes in a file stored on the data source for detecting the occurrence of events indicative of access to data using the data source or stored on the data source.

In an embodiment, the data source is one of an endpoint computing device and a cloud storage.

In an embodiment, the at least one agent comprises a remediation action module configured to implement the corresponding remediation actions on the data source.

In accordance with another general aspect, there is also provided a computer implemented method for automated sensitive information discovery, monitoring and remediation. The method comprises the steps of: monitoring activity of a corresponding data source; detecting the occurrence of events indicative of access to data using the data source or stored on the data source; identifying the events indicative of a potentially threatening access to sensitive information by a user; identifying the events classified as potentially threatening events regarding sensitive information stored on the data source or accessed using the data source; performing data extraction of one of data and a file associated to each one of the events classified as potentially threatening events and generating extracted data therefrom; performing data analysis of the extracted data associated to each one of events classified as potentially threatening events and determining a sensitivity score indicative of a level of sensitivity thereof; communicating the events classified as potentially threatening events and the sensitivity score of the one of the data and the file associated to each one of the events classified as potentially threatening events to a central platform storing the information over time and generating therefrom additional contextual and historical data relative to one of a specific user or group of users associated to the data source, the data source, a specific file type stored on the data source and a specific data type stored on the data source; analyzing the sensitivity score associated to each one of the events classified as potentially threatening events in combination with the additional contextual and historical data relative to the one of the specific user or group of users associated to the data source, the data source, the specific file type stored on the data source and the specific data type stored on the data source, to identify a potential security risk relative to the one of the specific user or group of users associated to the data source, the data source, the specific file type stored on the data source and the specific data type stored on the data source; and triggering remediation actions relative to the one of the specific user or group of users associated to the data source, the data source, the specific file type stored on the data source and the specific data type stored on the data source, upon detection of the potential security risk.

In an embodiment, the method further comprises the steps of generating metadata regarding the extracted data and communicating the metadata associated to each one of the events classified as potentially threatening events to the central platform.

In an embodiment, the contextual and historical data includes at least one of events frequencies, a global sensitivity score for the specific user or group of users associated to the data source, a data location, behavioral patterns associated to the one of the specific user or group of users associated to the data source, the data source, the specific file type stored on the data source and the specific data type stored on the data source, a type of changes performed on a file associated to one of the events classified as potentially threatening events, a number of files associated to the specific user or group of users associated to the data source and a data type associated to the to one of the events classified as potentially threatening events.

In an embodiment, the step of determining the sensitivity score indicative of the level of sensitivity of the one of the data and the file associated to each one of the events classified as potentially threatening events is performed using at least one of a comparison of TF-IDF vectors generated for the corresponding one of the data and the file and at least one reference file and a correlation analysis between sensitive information identified with REGEXs and user identifiers.

In an embodiment, the step of triggering remediation actions includes determining remediation actions based on predetermined scenarios defining the remediation actions to be taken for specific situations.

In an embodiment, the remediation actions include at least one of network access restriction, modification of file access rights, file encryption, user session termination, alert generation and user education recommendations.

In an embodiment, the method further comprises generating a hash value for each version of each file stored on the data source and wherein the step of detecting the occurrence of events includes using the generated hash value to perform detection of changes in a file stored on the data source.

In an embodiment, the method further comprises implementing the corresponding remediation actions on the data source.

In accordance with another general aspect, there is further provided a computer-readable memory having recorded thereon statements and instructions for execution by a computer, said statements and instructions comprising code means for performing the steps of the method as described above.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
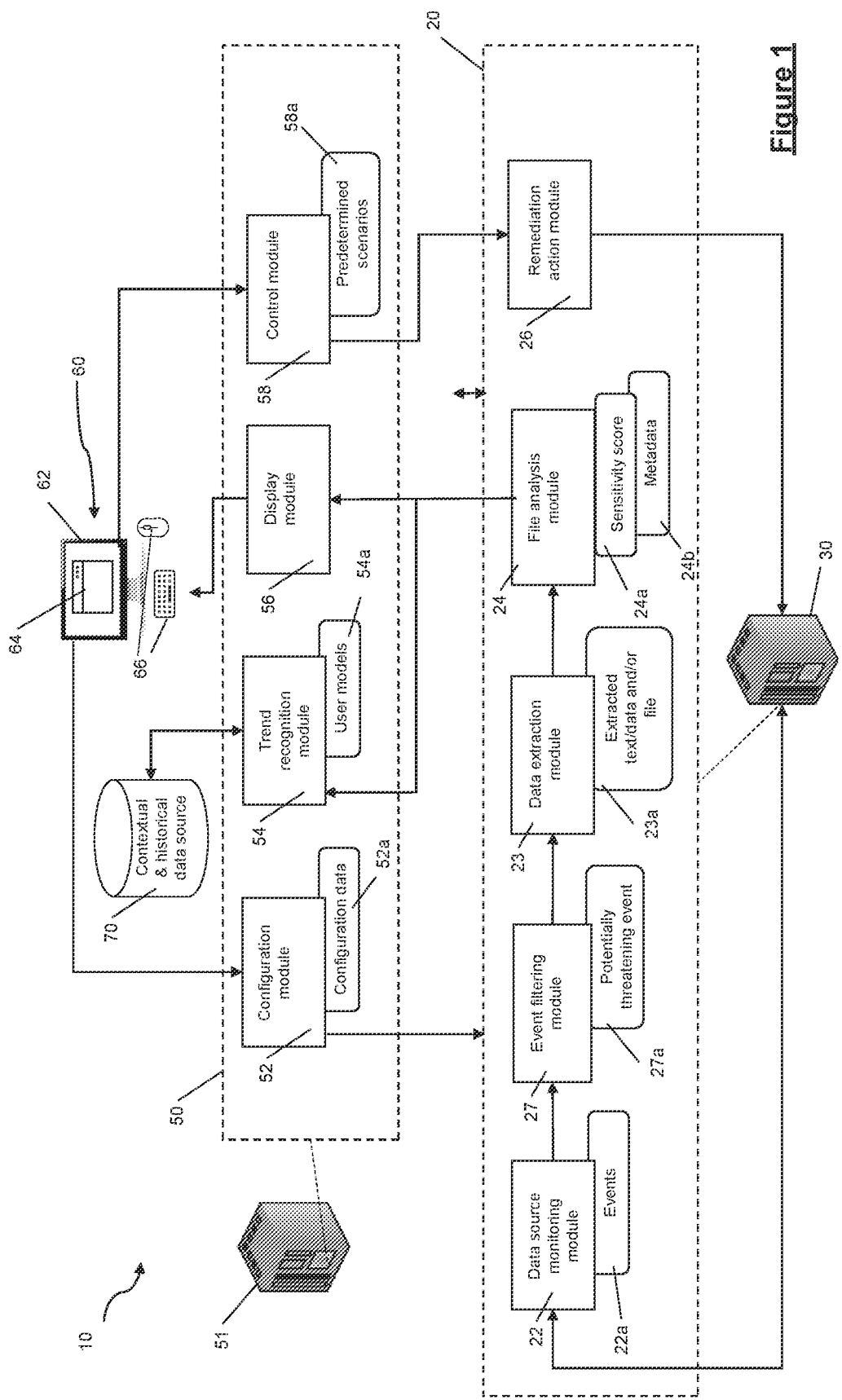
FIG. 1 is a schematic representation of the system for automated sensitive information discovery, monitoring and remediation, in accordance with an embodiment.

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the system for automated sensitive information discovery, monitoring and remediation consist of certain components as explained and illustrated herein, not all of these components are essential and thus should not be taken in their restrictive sense. It is to be understood, as also apparent to a person skilled in the art, that other suitable components and cooperation there in between, may be used for the system for automated sensitive information discovery, monitoring and remediation, as will be briefly explained herein and as can be easily inferred herefrom by a person skilled in the art.

Moreover, although the associated method includes steps as explained and illustrated herein, not all of these steps are essential and thus should not be taken in their restrictive sense. It will be appreciated that the steps of the method for automated sensitive information discovery, monitoring and remediation described herein may be performed in the described order, or in a different order. In an embodiment the steps of the proposed method are implemented as software instructions and algorithms, stored in computer memory and executed by processors. It should be understood that servers and computers are therefore required to implement to proposed system, and to execute the proposed method. In other words, the skilled reader will readily recognize that steps of the method described herein can be performed by programmed computers. In view of the above, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

In the course of the present document, the term "data source" is used to refer to any component which can access and/or store data accessible by a user. For example and without being limitative, a data source can be a computing device having a processor and a memory for storing data, a data storage storing data accessible by a computing device, for example via an IP network, a wired connection or the like (e.g. a database, a cloud storage location, an external memory disk, a data server, etc.), or any combination thereof.

The term "computing device" is used to encompass computers, servers and/or specialized electronic devices which receive, process and/or transmit data. "Computing devices" are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data.

One skilled in the art will therefore understand that each such computing device typically includes a processor (or multiple processors) that executes program instructions stored in the memory or other non-transitory computer-readable storage medium or device (e.g., solid state storage devices, disk drives, etc.). The various functions, modules, services, units or the like disclosed hereinbelow can be embodied in such program instructions, and/or can be implemented in application-specific circuitry (e.g., ASICs or FPGAs) of the computing devices. Where a computer system includes multiple computing devices, these devices can, but need not, be co-located. In some embodiments, a computer system can be a cloud-based computing system whose processing resources are shared by multiple distinct business entities or other users.

It should be appreciated by those skilled in the art that any block diagrams herein represent conceptual views of illustrative circuitry embodying the principles disclosed herein. Similarly, it will be appreciated that any flow charts and transmission diagrams, and the like, represent various processes which may be substantially represented in computer-readable medium and so executed by a computer or processor, whether or not such computer or processor is explicitly shown.

The computer implemented system for automated sensitive information discovery, monitoring and remediation and the associated computer implemented method, which will be described in more details below, are designed to provide a solution for constantly monitoring and assigning a sensitivity score to text/data in a file or a group of files and therefore quantifying the sensitivity of the data held on or accessed using a specific data source. The present solution therefore allows an assessment of the quantity of sensitive information held or accessed through the data source, to help secure the data of the data source, for example by helping to flag potentially dangerous situations where a specific user has access to a higher degree of sensitive information than is required to perform its duties, and to perform appropriate remediation actions. In other words, the solution described herein can perform continuous surveillance of the amount of sensitive information obtained by (or accessible to) users having access to a data source and to rapidly identify users who gather or access more sensitive information than would normally be required (or more sensitive data than what is historically gathered or accessed by the user), perform unauthorized actions with regards to such sensitive information, etc., therefore allowing identification of potential data leak situations that should be further investigated and/or remediated. As will be described in more details below, when an unusual situation is identified, automated remediation actions can also be taken since the information is centralized and monitored. It will be understood that the choice of remediation action will depend on numerous factors and situation parameters as will be described in more details below.

Figure 2:
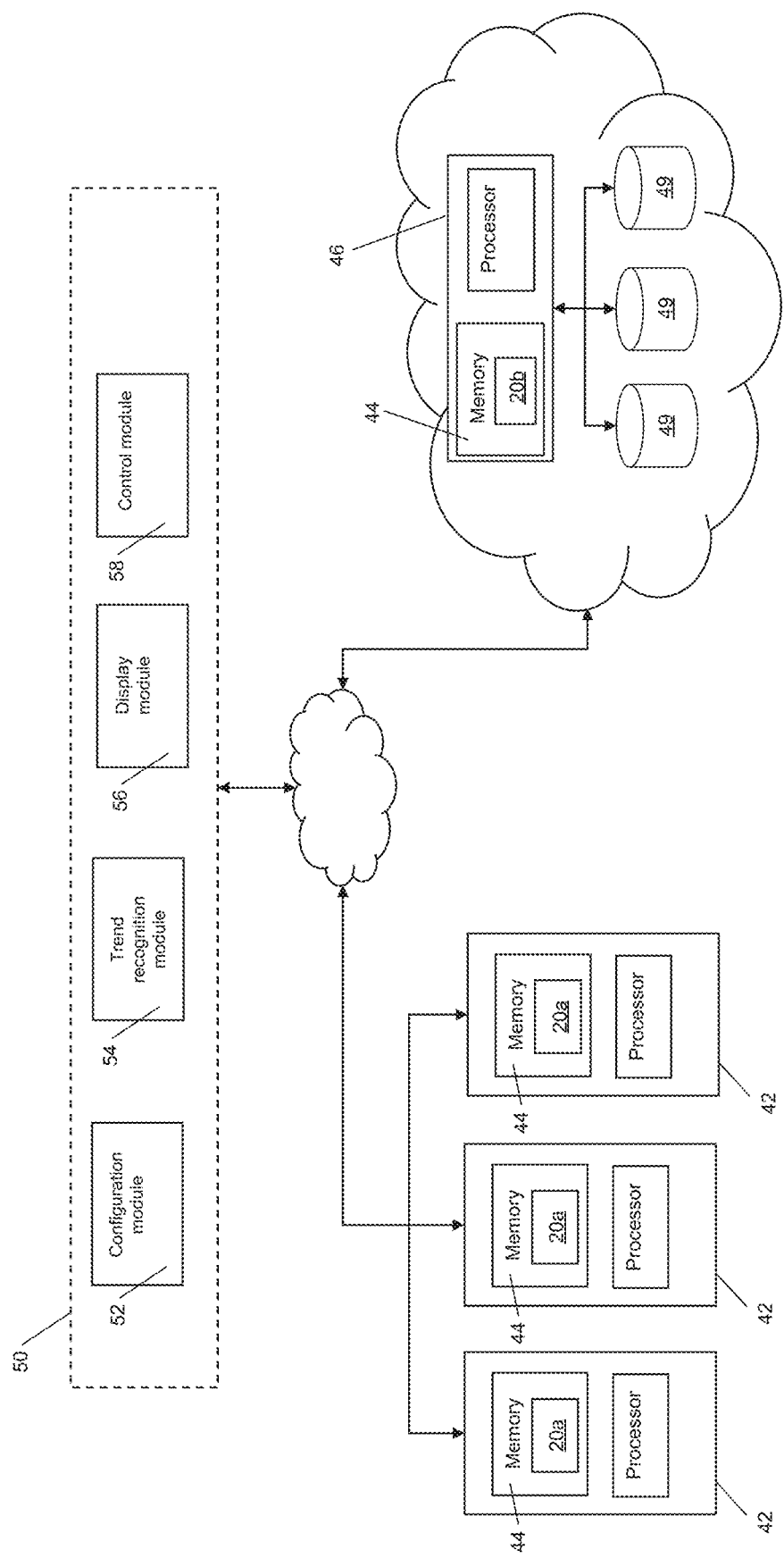
FIG. 2 is a schematic representation of additional components of the system for automated sensitive information discovery, monitoring and remediation of FIG. 1, in accordance with an embodiment.

Referring to FIGS. 1 and 2, in an embodiment, the system 10 for automated sensitive information discovery, monitoring and remediation includes a central platform 50 in data communication with a plurality of agents 20 configured to monitor and analyse data stored on corresponding data sources 30. The central platform 50 is a software unit stored in a memory of a central computing device 51 and defining instructions which, when executed by a processor, can perform computer implemented tasks.

As will be described in more details below, in an embodiment, the agents 20 are configured to perform the monitoring of the data sources 30, the scanning of files stored on the data source 30 or accessible therewith and the analysis of the files. The monitoring of the data sources 30, the scanning of files stored on the data source 30 or accessible therewith and the analysis of the files can be performed locally on local endpoint computing devices or on cloud-based solutions to monitor cloud data. In an embodiment, the agents 20 are configured to perform the monitoring and analysis of the data stored on the corresponding data sources 30 in real-time (or near real time). One skilled in the art will however understand that, in an alternative embodiment, the monitoring and/or analysis can be performed on demand only.

In the course of the present description, the term "agent" is used to define a software unit stored in a memory of a computing device and defining instructions which, when executed by a processor, can perform tasks in the background. In the course of the present document, the agent can perform monitoring of the data source to detect events indicative of access to data using a data source or stored on a data source (i.e. events having potential incidence on the data stored on the data source) and to perform data extraction and analysis which can be used to generate a sensitivity score for a file or a group of files stored on the data source and quantify the sensitivity of the data associated to an event and/or held on a specific data source.

In an embodiment (see FIG. 2), the system 10 includes endpoint agents 20a performing file scanning and analysis locally on the local endpoint computing devices 42 and cloud agents 20b performing file scanning and analysis of cloud data on cloud storage 49. In an embodiment, the endpoint agents 20a can be stored in a memory 44 of corresponding endpoint computing devices 42 operating as data sources 30, to monitor events and perform data extraction and analysis, for subsequent generation of a sensitivity score for a file or a group of files accessed with and/or stored on the endpoint computing devices 42. The generated sensitivity score of the files or the group of files accessed with and/or stored on the endpoint computing devices 42 is subsequently used to generate a corresponding quantification of the sensitivity of the data held or accessed by the endpoint computing devices 42 operating as data sources 30. One skilled in the art will understand that, in alternative embodiments (not shown), the endpoint agents 20a could also be stored in a memory of a remote computing device in data communication with the endpoint computing devices 42 over a network, to remotely perform the monitoring of events and data extraction and analysis.

In an embodiment, the cloud agents 20b can be stored in a memory 48 of a cloud computing device 46 in data communication with a cloud data storage 49 such as, for example and without being limitative a Sharepoint drive, a Onedrive drive, a Google Drive, AWS cloud storage, or any other cloud-based drive or data storage solution or service, to perform the monitoring of events and data extraction and analysis relative to data stored in the corresponding cloud storages 49.

In the embodiment shown, the agents 20 (i.e. the endpoint agents 20a and/or cloud agents 20b) include a data source monitoring module 22, an event filtering module 27, a data extraction module 23, a file analysis module 24 and a remediation action module 26. The central platform 50 includes a configuration module 52, a trend recognition module 54, a display module 56 and a control module 58. Uses and operations of the above-mentioned modules will be detailed below.

In more details, the configuration module 52 of the central platform 50 can be accessed and used by users to set and/or update parameters regarding the desired security protocols, policies and/or notifications of the system 10. The configuration module 52 of the central platform 52 can also be used to define sensitivity parameters of the system 10 (i.e. to define the level of sensitive data which can be identified by the system 10 without being considered by the system 10 as a potential security threat and/or without generating a security warning). It will be noted that the sensitivity parameters can be defined differently for different users and/or for different groups of users, for example depending on the position and/or job description of each users or groups of users, which allows or require access to more or less sensitive data. In an embodiment, the configuration module 52 can be accessed via a graphical user interface 64 displayed on a display 62 of an administrator computing device 60 in data communication with the central platform 50. It will be understood that input devices 66 associated to the administrator computing device 60 can be used for data input, for example by an administrator configuring and/or updating the parameters of the system 10.

In an embodiment, the configuration module 52 generates configuration data 52a defining the parameters of the system 10 as configured in the configuration module 52. The configuration data 52a is transmitted to the agents 20 and is used by the agents 20 in the implementation of the corresponding file scanning and analysis, for proper functioning thereof.

In an embodiment, the data source monitoring module 22 of the endpoint agents 20a is configured to perform real time (or near-real time) monitoring of activity of the corresponding endpoint computing device 42, in order to detect events 22a occurring thereon and indicative of access to data using the endpoint computing device 42 or stored on the endpoint computing device 42. In the course of the present description, the term "event" is used to refer to an action performed using the data source 30 and which can have an incidence on acquisition, download, storage, upload and/or more generally, access to data stored thereon or accessible therewith. For example and without being limitative, in an embodiment, an event can include, without being limited to, creation and/or modification of files stored on the data source 30, clipboard events relative to the data source 30 (i.e. copying, cutting and/or pasting data stored on the data source 30 or access therefrom (including the capture of screenshots)), file events associated with connected external device storage (i.e. data downloaded or uploaded to/from an external device storage connected to the data source 30), etc.

For example and without being limitative, the data source monitoring module 22 of the endpoint agents 20a can perform file systems scanning for detection of events 22a related to systems files of the endpoint computing device 42, perform monitoring of modification in files or data stored on the endpoint computing device 42 or accessed therefrom for detection of events 22a related thereto, perform monitoring of removable storage device events 22a (e.g. events 22a related to USB storage devices) connected to the endpoint computing device 42, perform monitoring of clipboard events 22a for the endpoint computing device 42, etc.

Similarly, in an embodiment, the data source monitoring module 22 of the cloud agents 20b is configured to perform real time (or near-real time) or on demand monitoring of activity of the corresponding cloud storage 49 in order to detect events 22a occurring thereon and indicative of access to data stored on the cloud storage 49. For example and without being limitative, the data source monitoring module 22 of the cloud agents 20b can perform file system scanning for detection of events 22a related to system files of the cloud storage 49, perform detection of changes in files or data stored on the cloud storage 49 for detection of events 22a related thereto, etc.

For example and without being limitative, in an embodiment, a hash value is generated for each version of each file stored on a data source 30 (i.e. an endpoint computing device 42 or a cloud storage 49) and is associated therewith. The detection of changes in files or data stored on the endpoint computing device 42 or the cloud storage 49 can therefore be performed by comparing a hash value generated for the file with the hash value of the last version of the file. If the hash values match, no changes in the corresponding files or data is detected and if the hash values do not match, a change in the corresponding files or data is detected.

In view of the above, it will be understood that the agents 20 (including the endpoint agents 20a and the cloud agents 20b) are configured to detect the occurrence of events 22a related to at least one of the endpoint computing device 42 and the cloud storage 49.

In an embodiment, the events 22a gathered by the agents 20 using the data source monitoring module 22 can be filtered (i.e. classified) by the agents 20, using the event filtering module 27, to identify the potentially threatening events and to discard the non-potentially threatening events.

In an embodiment, the filtering of the events 22a can be performed by the event filtering module 27 of the agents 20 using a set of filtering parameters (i.e. the event being considered potentially threatening if included within the defined parameters, and being considered non-potentially threatening if not included within the defined parameters). In an embodiment, the set of parameters can be initially defined (and subsequently updated, if required) by an administrator using the above-described configuration module 52 and be communicated to the agents 20 through transmission of the configuration data 52a as described above.

Such parameters can include, for example and without being limited to, attributes such as the file type associated to the file linked to the specific event, the data type associated to the data linked to the specific event, the frequency and event distribution associated to the specific event (i.e. how frequently a similar events is re-occurring within a defined timeframe), etc. In an embodiment, the determination of the file type associated to the event can be performed using the content of the file rather than the extension thereof in order to increase accuracy. As an example, a new MS word file created on a desktop as an initial event would likely be viewed as a potential threat compared to an existing binary file modified frequently by the OS which would be seen as non-potentially threatening.

In view of the above, the event filtering module 27 of the agents 20 can therefore review each one of the detected events 22a, in view of the filtering parameters and determine whether each specific event 22a should be classified as potentially threatening or non-potentially threatening. In an embodiment, the events identified as non-potentially threatening can be discarded and the data relative to the events identified as potentially threatening can be communicated to the data extraction module 23 for further processing.

For each gathered event identified as potentially threatening by an agent 20, the data extraction module 23 is configured to perform text/data extraction for the files or the text/data associated to the specific event and generate extracted data 23a. It should be understood that, in an embodiment, conventional data extraction tools and methods can be used by the data extraction module 23 to perform optimized and customized text/data extraction for the files or the text/data associated to the specific event. In an embodiment, the data extraction module 23 can extract text/data for a wide variety of data formats. For instance and without being limitative, in an embodiment, the data extraction module 23 of the agent 20 can extract text/data from images, source code files, text files, pdf files, spreadsheet files and/or other data format type which can be stored or accessed using an endpoint computing device 42 or stored on a cloud storage 49. In an embodiment, the data extraction module 23 extract text/data and generates Media type (MIME type) files (or other usable data files) which can handle optical character recognition.

In an embodiment, following the extraction of the text/data and/or the file associated to the event identified as potentially threatening by the data extraction module 23, the text/data is now in a format which allows optical character recognition to perform analysis by the file analysis module 24 of the agent 20. The file analysis module 24 is configured to receive the extracted text/data and/or file 23a and to process the text/data and/or file, in order to determine a level of sensitivity of the text/data and/or the file (i.e. to assign a sensitivity score 24a corresponding to the associated event). In an embodiment, the file analysis module 24 is further configured to generate metadata 24b relative to the text/data and/or the associated file about the text/data and/or the file. For example and without being limitative, such metadata can include, but is not limited to, additional information such as file encryption, timestamp, file language, pii (personal individual information) report, extension, path, MIME type, etc.

Two possible analysis methods which can be used alone or in combination by the file analysis module 24 to determine a level of sensitivity of the text/data and/or the associated file (i.e. to determine a sensitivity score for the data associated to the specific event) will be described in details below with reference to FIGS. 3 and 4. One skilled in the art will however understand that, in alternative embodiments, the file analysis module 24 could use other analysis tools or methods, alone or in combination with the analysis methods disclosed herein, in order to determine a level of sensitivity of the text/data and/or the file for each associated event being considered as potentially threatening.

Still referring to FIG. 1, in an embodiment, the file analysis module 24 is configured to transmit the sensitivity scores 24a and the metadata 24b relative to the associated potentially threatening events 27a to the trend recognition module 54 and to the display module 56 of the central platform 50, for each one of the potentially threatening events 27a. In an embodiment, additional data relative to the associated potentially threatening events 27a, such as the event type, the data source, the data type, etc., are also communicated to the trend recognition module 54.

The trend recognition module 54 is configured to analyze the sensitivity scores 24a and the metadata 24b relative to the associated event 27a, in combination with a plurality of additional contextual and historical data relative to at least one of the associated potentially threatening event 27a, the associated data source 30, the user associated to the data source 30, and other users of the system 10, to evaluate the overall potential security risk associated with the corresponding data source 30. For example and without being limitative, in an embodiment, the trend recognition module 54 is configured to consider the event frequency, the type of potentially threatening events 27a, the sensitivity score of the potentially threatening events 27a, the location of the data/text associated with the potentially threatening events 27a and/or the behavioral patterns associated with the data source 30 or the corresponding user, to detect unusual behavior for the associated data source 30 for performing risk detection.

In an embodiment, a potential security risk can be identified by the trend recognition module 54 when the overall potential security risk reaches or is above a predetermined threshold for the corresponding data source 30 or a corresponding user or group of users associated with the data source 30.

In an embodiment, the trend recognition module 54 is in data communication with a contextual and historical data source 70 storing contextual and historical data relative to previous potentially threatening event 27a communicated to the trend recognition module 54. In an embodiment, when a new potentially threatening event 27a is communicated to the trend recognition module 54, the trend recognition module 54 is configured to upload the sensitivity score 24a, the metadata 24b and the additional data relative to the associated potentially threatening event 27a to the contextual and historical data source 70. Hence, over time, contextual and historical data is stored in the contextual and historical data source 70 and can be used by the trend recognition module 54 in order to evaluate the overall potential security risk associated with the corresponding data source 30 or a user or group of user associated therewith.

In an embodiment, the trend recognition module 54 is configured to build trend models 54a relative to one of a specific user (or group of users) associated to a corresponding data source 30, a specific data source 30, a file type and a data type. The trend models 54a include behavior patterns concerning the storage and/or access of data for the specific user associated to the corresponding data source 30, the specific data source 30, the file type and the data type, over time (i.e. historical trends in events associated with the specific user associated to the corresponding data source 30, the specific data source 30, the file type and the data type). The trend models 54a can be stored on the contextual and historical data source 70 and be used by the trend recognition module 54 to detect when a series of potentially threatening event 27a depart from the trend identified in the corresponding trend models 54a, regarding to corresponding one of the specific user associated to the corresponding data source 30, the specific data source 30, the file type and data type. Upon detection of a series of potentially threatening event 27a departing from the trend identified in the corresponding trend models 54a, regarding the corresponding one of the specific user associated to the corresponding data source 30, the specific data source 30, the file type and the data type, a potential security risk can be identified by the trend recognition module 54.

The display module 56 is configured to display data on a display screen to provide relevant data relative to the gathered potentially threatening events 27a and corresponding text/data sensitivity scores 24a. For example and without being limitative, in an embodiment, the display module 56 is configured to display at least one of an overview of the overall sensitivity score of the endpoint computing devices 42 of the system 10 (based on the sensitivity scores 24a of all potentially threatening events 27a associated therewith and the corresponding contextual and historical data), threat (risk) notifications from the potential security risks determined by the trend recognition module 54, graphs and/or statistics, data history, and/or recommended actions.

In an embodiment, possible remedial actions include restricting network communication for an endpoint computing device 42, for example through the use of host-based firewall or the like, restricting or modifying file access rights (temporary or permanently), file "lock" through the use of existing cryptography mechanism (for example by generating individual keys per file and managing those keys within the central platform 50), user session termination, generation of an alert based on the defined alerting policies of the configuration module 52 (for example alerting the data owner, the data custodian, the administrator, etc.), recommending user education, etc. One skilled in the art will understand that, in alternative embodiment, other actions could also be suggested or performed by the system 10. Remediation actions can also be enforced or applied by external components through API calls initiated by the systems 10.

In an embodiment, the control module 58 is configured to allow automatic trigger of the remedial actions or triggering of manual actions transmitted to the control module by the administrator computing device 60 (operated by an administrator). In other words, the control module 58 can trigger remediation actions automatically or trigger remediation actions following input received from an administrator deciding to take a particular action based on the information provided by the display module 56.

In an embodiment, the control module 58 can trigger remediation actions automatically based on predetermined scenarios 58a defining the remediation actions to be taken for specific situations. For example and without being limitative, a scenario can define a specific remediation action to be taken (e.g. restricting network communication for an endpoint computing device 42 associated to a specific user) if an overall potential security risk associated with the corresponding data source 30 is higher than a predetermined threshold.

In order to execute a remediation action, the control module 58 of the central platform 50 communicates with the remediation action module 26 of the corresponding agent 20, which is configured to implement the corresponding remediation actions on the associated data source 30, thereby allowing prevention of data leaks when a potential security risk is identified. It will be understood that the implemented remediation action is proportionate with the threat level detected. Hence, lower risks will trigger softer actions such as warnings, alerts or the like, while more severe risks will trigger harsher actions such as network restriction, file "lock", access rights modifications, or the like. This is important as organizations nowadays have limited resources to respond to such events and automation is crucial in scaling.

Now referring to FIGS. 3 and 4, two possible analysis methods which can be used alone or in combination by the file analysis module 24 to determine a level of sensitivity of the text/data and/or the associated file (i.e. to determine a sensitivity score and metadata relative to the associated event) will now be described in detail below. As mentioned above, it will be understood that, in alternative embodiments, other analysis tools or methods could be used by the file analysis module 24 (alone or in combination with the analysis methods disclosed herein) to determine a level of sensitivity of the text/data and/or the associated file.

First Method

In the first method, the level of sensitivity of a file can be determined by its level of similarity with reference files representing typical files having a high secretive value in a specific environment or context. Indeed, in certain contexts, a specific type of file (e.g. certain types of contracts, legal opinions, text files describing industrial processes, text files presenting industrial recipes, technical reports, etc.) can be highly valuable and hence correspond to highly sensitive information for this specific environment.

Figure 3:
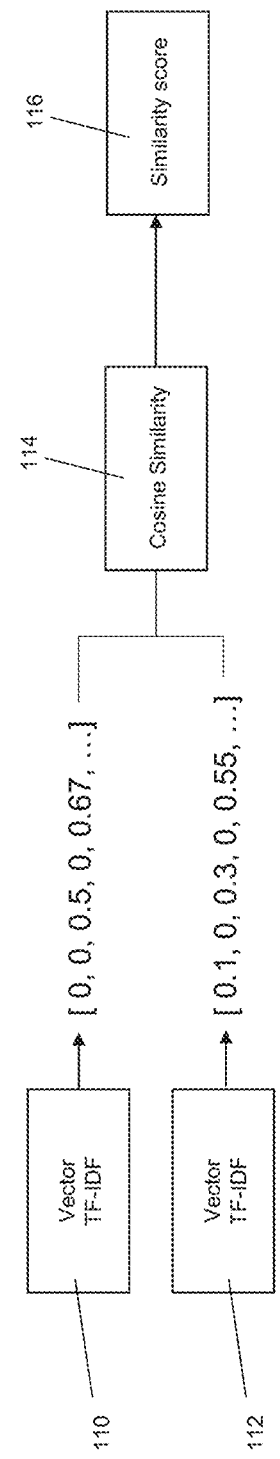
FIG. 3 is a simplified schematic representation of a first analysis method using TF-IDF vectors comparison between analyzed data and a reference file to determine a level of sensitivity of text/data and/or an associated file, in accordance with an embodiment.

FIG. 3, shows a simplified view of a sequence for determining the similarity score of text/data and/or the associated file in accordance with this first method.

In such an embodiment, the reference files representing typical files having a high secretive value in the specific environment are initially processed using a Term Frequency Inverse Document Frequency (TF-IDF) algorithm to generate, for each file, a reference TF-IDF vector 110 characterizing the reference file. One skilled in the art will understand that the reference TF-IDF vectors 110 will be multi-dimensional.

To perform file analysis in order to determine a level of sensitivity of the text/data and/or the associated file (i.e. to assign a sensitivity score to the text/data and/or the associated file), the file analysis module 24 can process the corresponding text/data and/or the associated file, also using the TF-IDF algorithm to generate an analysis TF-IDF vector 112 for this specific text/data and/or the associated file. Once again, it will be understood that the analysis TF-IDF vectors 112 will be multi-dimensional.

Subsequently, the reference TF-IDF vectors 110 and the analysis TF-IDF vector 112 can be compared to determine a similarity level of the text/data and/or the associated file being currently analyzed with the reference files (i.e. to assign a sensitivity score to the text/data and/or the associated file). In other words, the reference files and the analyzed text/data and/or the associated file can be compared, through analysis of their corresponding TF-IDF vectors 110, 112.

In the embodiment shown, comparison of the corresponding TF-IDF vectors 110, 112 is performed through cosine similarity determination 114 of the corresponding TF-IDF vectors 110, 112. For example and without being limitative, in an embodiment, the cosine similarity function 114 used to issue a similarity score 116 is:

$$\text{similarity}(AB) \frac{A \cdot B}{A \times B} \frac{\sum A \times B}{\sqrt{\sum A^2 \times \sum B^2}}$$

One skilled in the art will understand that, in an alternative embodiment (not shown), machine learning algorithms could also be used to analyze and compare the corresponding TF-IDF vectors 112, 112 and determine a similarity score 116 for the reference file and the analyzed text/data and/or the associated file. For example and without being limitative, in an embodiment (not shown), one or more neural networks can be trained using training datasets, to determine a similarity score for the reference file and analyzed text/data and/or the associated file. For example, the training dataset can be a data set where similarity scores between reference files and analyzed text/data and/or the associated file has previously been determined.

In an embodiment, the similarity score of a specific text/data and/or the associated file can also be calculated relative to a group of reference files. For example and without being limitative, in such an embodiment, the sensitivity score of the specific text/data and/or the associated file can be determined as being the highest of the similarity scores between the specific text/data and/or the associated file and all the reference files, as determined though TF-IDF vectors 110, 112, comparison using cosine similarity determination 114 of the corresponding TF-IDF vectors 110, 112, as described above for the specific text/data and/or the associated file and each one of the reference files. In such an embodiment, the specific text/data and/or the associated file which are found to be highly similar to the reference files identified as files of high value for a business (i.e., having a high similarity score when compared to such files), are identified as containing highly sensitive data.

In view of the above, it will be understood that this first method is mainly focused on the type and subject of the file and helps complementing the second technique of the analysis which is more focused on the content itself (sensitive data) as will be described in more details below.

Second Method

Figure 4:
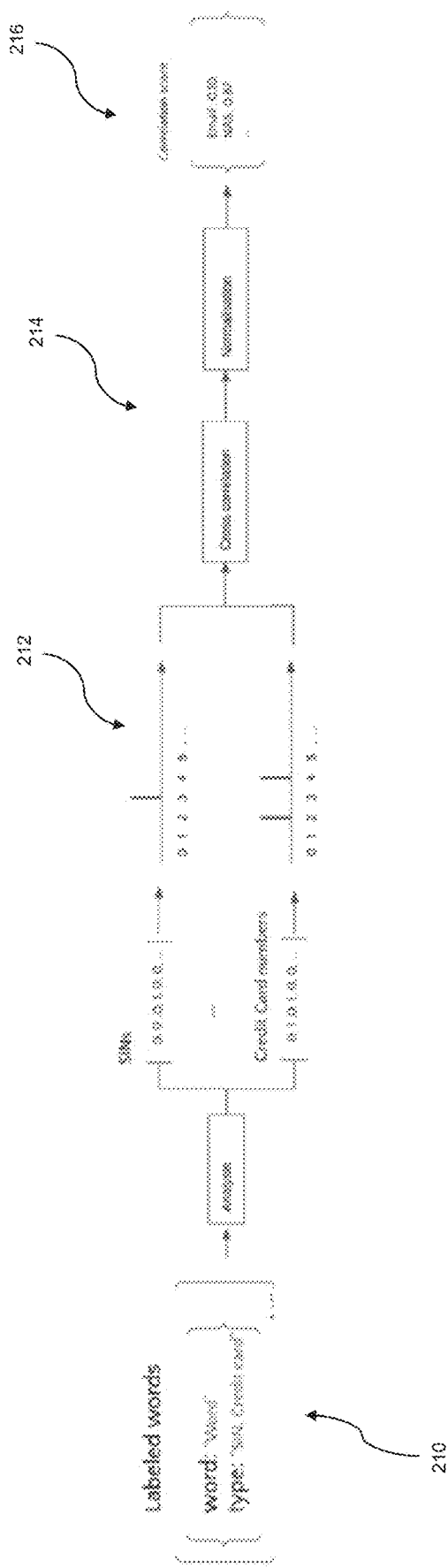
FIG. 4 is a simplified schematic representation of a second analysis method using correlations between REGEX identified information and user identifiers to determine a level of sensitivity of text/data and/or an associated file, in accordance with an embodiment.

Now referring to FIG. 4, in the second method, the level of sensitivity of a file can be determined by identification of text corresponding to sensitive information in analyzed text/data and/or the associated file. In this second method, the identification of potentially sensitive information within the text/data and/or the associated file is performed by a sequential combination of multiple analysis being performed.

Firstly, the text/data and/or the associated file is scanned to determine the presence (or absence) of a series of pre-identified regular expressions (REGEX) 210 each corresponding to a known format of a specific sensitive information (ex: credit card number, social security number, phone number, bank account number, street address, etc.). The more REGEXs 210 being identified in a file, the greater the quantity of sensitive information being likely to be encompassed in the file. Different weights can be imparted to the different REGEXs 20 depending on the level of sensitivity of the information being potentially identified via this particular REGEX 210.

Secondly, the text/data and/or the associated file is scanned to determine the presence (or absence of) secondary user identification data corresponding to user identifiers 212 which can identify a particular individual, such as for example and without being limitative, names of individuals. One skilled in the art will understand that user identifiers 212 could include identifiers associating the sensitive information to an entity (company name, specific user identifier, etc.). For example, in an embodiment, the identification of names of individuals could be performed by a combination of a machine learning algorithm (using a neuronal network trained to identify names in a text) and a brute force algorithm comparing each words of a text with a list of common First names/Last names. One skilled in the art will understand, that in alternative embodiments, identification of other user identifiers 212 could also be performed using a similar combination of machine learning algorithms and brute force, or through one of machine learning algorithms, brute force or other data identification methods or tools.

Following identification of the potential sensitive information via the REGEXs 210 and the individual names or personal identifiers 212 by the machine learning and/or brute force, a precise correlation analysis 214 can be performed to associate the sensitive information and the names or identifiers. In an embodiment, the correlation 214 is based on mathematical analysis of the entire text/data and/or the associated file as can be seen in FIG. 4. In this case, Data vectors 216 can be superposed to identify potential correlation along with a score, ensuring the correlation is performed through the entire file and not limited to specific sections.

Following the precise correlation analysis 214, a sensitivity score can be determined based on the weight of the sensitive information identified with each REGEX 210 and its level of correlation with identified names or user identifiers 212. Files having the greatest level of sensitivity correspond to files having a large quantity of highly sensitive information (i.e. the greater the amount of sensitive information assigned a greater weight, with a high level of correlation with identified names, the greater the level of sensitivity being assigned to the text/data and/or the associated file). The rationale behind this analysis is that personal information (i.e. information that can be linked to a specific individual, company, etc.) is the most sensitive information and should be prioritized based on the sensitivity score.

In an embodiment, the file analysis module 24 can perform correlation of irregular files format (for example tables) while providing accurate correlation results.

In view of the above, it will be understood that this second method is particularly effective to quantify the sensitivity level for personal data, financial data, etc., where the information to be protected is linked to an identifier 212 (such as an individual's name) and at least part of the value of the sensitive data stems from its link to this identifier 212.

Hence, it will be understood that both the first method and the second method described above can be performed by the file analysis module 24 (alone or in combination) to enable the agents 20 to accurately discover and quantify the amount of sensitive information held within a data source 30. In an embodiment, the file analysis module 24 can perform both methods in real-time, constantly or sequentially by leveraging results from the other method.

As described above, in an embodiment, the sensitivity score relative to text/data and/or the associated file of the associated event are communicated to the trend recognition module 54 and to the display module 56 of the central platform 50, such that data is gathered on the central platform 50 where real-time view is provided along with contextual and historical data for files, users and data sources 30 (whether it is a cloud-based data storage, a physical endpoint computing device or any other information source the user interacts with). Contextual and historical data gathered and provided by the central platform 50 (such as, for example and without being limitative, changes in files, user's sensitivity (or security) score, number of files, type of information, etc.) help the operator of the system prioritizing higher risks and make sound decisions based on the information provided. This information can also help in case of a security breach, to go back in time and retrace the chain of events that lead to the situation, for example to help a forensic investigation.

In an embodiment, a method performing the steps performed by the components of the system as described above is also provided.

Operational Examples of the System and Method

To better understand the operation of the above described system 10 for automated sensitive information discovery, monitoring and remediation, operational examples are provided below.

First Example

In a first example, a first user using the system is a user working in sales and being responsible for sending proposals to customers. This first user prefers keeping proposals on its laptop (endpoint device 42) for convenience, even though the organization requires all proposals to be uploaded to a cloud storage. After a few months of work, this first user now has over 100 customer's proposals stored on its laptop. The laptop is now a potential threat for the information security of the company because the data stored on the laptop could be very damaging if leaked.

In this first example, the system 10 identifies events 22a corresponding to download/creation of the proposal files on the first user laptop, upon creation/download of the files. The events 27 are identified by the data source monitoring module 22 of the agent 20a stored on the endpoint device 42 (the laptop), when new files are created on the laptop. The events are identified as potentially threatening by the event filtering module 27 and the combination of the data extraction module 23 and the file analysis module 24 is used to generate the sensitivity score 24a and the metadata 24b associated to the corresponding proposal files. The sensitivity score 24a, the metadata 24b and the additional data relative to the associated potentially threatening events 27a are sent to the trend recognition module 54 for each potentially threatening events 27a detected (each creation/download of a proposal file).

At first, the number of proposal files is not significant enough for the trend recognition module 54 to raise an alert, as the user is authorized to handle such files. Given that the trend recognition module 54 keeps monitoring potentially threatening events 27a corresponding to storage of sensitive information on the endpoint computing device 42, over time the trend recognition module 54 is able to identify a trend where too many sensitive data is stored on the endpoint computing device 42 and identify a potential security risk, when a predetermined or dynamic threshold is reached.

When the potential security risk is identified, the central platform 50 can take one or multiple remediation actions. For example, at first a system administrator can be notified that the specific endpoint computing device 42 (the laptop of the user) was detected as a significant security risk. The control module 58 can also send a command to the agent 20a installed on the endpoint computing device 42 to restrict access to the proposals files and therefore prevent intentional or inadvertent leaking of the information.

All information regarding the status of the endpoint computing device 42 and the evolution of the files stored thereon is stored in the contextual and historical data source 70 and can be accessed to conduct an investigation after the threat was mitigated.

Second Example

A second user being a marketing specialist has been working for a company for a few months. He is approached by a new employer and offered a new job in marketing. Before leaving, he downloads all customer leads locally, in order to follow up on them at his new job.

In such a case, the agent 20a installed on the user's computer (the endpoint computing device 42) immediately detect multiple events 27 corresponding to download of files on the corresponding endpoint device 42, upon download of the files. The events 27 are identified by the data source monitoring module 22 of the agent 20a stored on the endpoint device 42, when new files are created on the laptop. The events are identified as potentially threatening by the event filtering module 27 and the combination of the data extraction module 23 and the file analysis module 24 is used to generate the sensitivity score 24a and the metadata 24b associated to the corresponding proposal files. The sensitivity score 24a, the metadata 24a and the additional data relative to the associated potentially threatening events 27a are sent to the trend recognition module 54 for each potentially threatening events 27a detected (each creation/download of a proposal file).

The trend recognition module 54 immediately recognizes an unusual increase in the quantity of sensitive information stored on the corresponding endpoint device 42 and identifies a potential security risk, as the overall amount of sensible information increases quickly on the endpoint device 42.

When the potential security risk is identified, the central platform 50 can take one or multiple remediation actions. For example, the control module 58 can send a command to the agent 20a installed on the endpoint computing device 42 to revoke user access for this user for this endpoint device 42. The system administrator, or a supervisor, can also be notified of the sudden download of a high level of sensitive information for follow-up.

Third Example

A third user has the agent 20a installed on her desktop computer at work without any reported incidents. For her work, this third user works with a table of customer data that is stored in the cloud. One day, to have access to the customer list from her personal phone, she decides to take a screenshot of the table using her desktop computer and send the screenshot via email, to one of her email account.

In such an example, the agent 20a installed on the user's desktop computer (the endpoint computing device 42) immediately detects the occurrence of the screenshot (as a clipboard event), through the data source monitoring module 22. The event is identified as potentially threatening by the event filtering module 27 and the combination of the data extraction module 23 and the file analysis module 24 is used to generate the sensitivity score 24a and the metadata 24b associated to the corresponding file (i.e. the image associated to the screenshot taken). The sensitivity score 24a, the metadata 24b and the additional data relative to the associated potentially threatening events 27a are sent to the trend recognition module 54 for this potentially threatening event 27a.

The trend recognition module 54 can flag that the sensitivity score is high as the table of customer data is considered highly sensitive information for this company and that the type of event (screenshot) is also a type of event associated with high security risk and therefore identifies a potential security risk.

When the potential security risk is identified, the central platform 50 can take one or multiple remediation actions. For example, the control module 58 can send notification to the system administrator for follow-up.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A system for automated sensitive information discovery, monitoring, and remediation, the system comprising:
    at least one agent stored in a memory of a computing device operating as a data source or in data communication with the data source, the at least one agent being a software unit and defining instructions which, when executed by a processor, can perform tasks in a background, the at least one agent comprising:
        a data source monitoring module monitoring activity of the data source and detecting an occurrence of events indicative of access to data using the data source or stored on the data source;
        an event filtering module filtering the events detected by the data source monitoring module and identifying events classified as potentially threatening events regarding sensitive information stored on the data source or accessed using the data source;
        a data extraction module performing data extraction of one of data and a file associated to each one of the events classified as potentially threatening events and generating extracted data therefrom; and
        a file analysis module performing data analysis of the extracted data associated to each one of the events classified as potentially threatening events and determining a sensitivity score indicative of a level of sensitivity thereof;
    a central platform in data communication with the at least one agent, the central platform being a software unit stored in a memory of a central computing device and defining instructions which, when executed by a processor of the central computing device, can perform computer-implemented tasks, the central platform comprising:
        a trend recognition module receiving the sensitivity score associated to each one of the events classified as potentially threatening events from the file analysis module and quantifying a sensitivity level of overall data held on or accessed by a specific user or group of users using the data source, the trend recognition module analyzing the sensitivity score associated to each one of the events classified as potentially threatening events in combination with additional contextual and historical data relative to one of the specific user or group of users associated to the data source, the data source, a specific file type stored on the data source and a specific data type stored on the data source, to identify a potential security risk relative to the data source or to the specific user or group of users associated to the data source when an overall potential security risk is greater than a predetermined threshold for the data source or the specific user or group of users associated to the data source, the predetermined threshold being adapted to the specific user or group of users associated to the data source and being representative of a quantity of sensitive information the specific user or group of users associated to the data source is allowed to access; and a control module triggering remediation actions relative to the one of the specific user or group of users associated to the data source, the data source, the specific file type stored on the data source and the specific data type stored on the data source, upon detection of a potential security risk.

2. The system of claim 1, wherein the file analysis module is configured to generate metadata regarding the extracted data, the metadata being communicated to the trend recognition module and being used by the trend recognition module to identify the potential security risk relative to the data source or to the specific user or group of users associated to the data source.

3. The system of claim 1, wherein the contextual and historical data includes at least one of events frequencies, a global sensitivity score for the specific user or group of users associated to the data source, a data location, behavioral patterns associated to the one of the specific user or group of users associated to the data source, the data source, the specific file type stored on the data source and the specific data type stored on the data source, a type of changes performed on a file associated to one of the events classified as potentially threatening events, a number of files associated to the specific user or group of users associated to the data source and a data type associated to the to one of the events classified as potentially threatening events.

4. The system of claim 1, wherein the file analysis module is configured to determine the sensitivity score indicative of the level of sensitivity of the extracted data from the one of the data and the file associated to each one of events classified as potentially threatening events using at least one of a comparison of Term Frequency Inverse Document Frequency (TF-IDF) vectors generated for the corresponding data or the files and at least one reference file and a correlation analysis between sensitive information identified with Regular Expressions (REGEXs) and user identifiers.

5. The system of claim 1, wherein the control module of the central platform is configured to determine remediation actions based on predetermined scenarios defining the remediation actions to be taken for specific situations.

6. The system of claim 1, wherein the central platform comprises a display module displaying data relative to the events classified as potentially threatening events and corresponding sensitivity score on a display screen of the computing device.

7. The system of claim 1, wherein the remediation actions include at least one of network access restriction, modification of file access rights, file encryption, user session termination, alert generation and user education recommendations.

8. The system of claim 1, wherein the system includes a configuration module configured to receive parameters regarding one of security protocols, policies and sensitivity parameters of the system, the configuration module generating configuration data defining the parameters of the system as configured therein, the configuration data being transmitted to the at least one agent, the event filtering module being configured to perform filtering of the events detected by the data source monitoring module using a set of filtering parameters initially defined using the configuration module.

9. The system of claim 1, wherein the central platform is configured to generate a hash value for each version of each file stored on the data source and wherein the data source monitoring module is configured to use the generated hash value to perform detection of changes in a file stored on the data source for detecting the occurrence of events indicative of access to data using the data source or stored on the data source.

10. The system of claim 1, wherein the data source is one of an endpoint computing device and a cloud storage.

11. The system of claim 1, wherein the at least one agent comprises a remediation action module configured to implement corresponding remediation actions on the data source.

12. A computer implemented method for automated sensitive information discovery, monitoring and remediation, the method comprising the steps of:
monitoring activity of a corresponding data source;
detecting an occurrence of events indicative of access to data using the data source or stored on the data source;
identifying events indicative of a potentially threatening access to sensitive information by a user;
identifying the events classified as potentially threatening events regarding sensitive information stored on the data source or accessed using the data source;
performing data extraction of one of data and a file associated to each one of the events classified as potentially threatening events and generating extracted data therefrom;
performing data analysis of the extracted data associated to each one of events classified as potentially threatening events and determining a sensitivity score indicative of a level of sensitivity thereof;
communicating the events classified as potentially threatening events and the sensitivity score of the one of the data and the file associated to each one of the events classified as potentially threatening events to a central platform storing information over time and
generating therefrom additional contextual and historical data relative to one of a specific user or group of users associated to the data source, the data source, a specific file type stored on the data source and a specific data type stored on the data source;
quantifying a sensitivity level of overall data held on or accessed by the specific user or group of users using the data source;
analyzing the sensitivity score associated to each one of the events classified as potentially threatening events in combination with the additional contextual and historical data relative to the one of the specific user or group of users associated to the data source, the data source, the specific file type stored on the data source and the specific data type stored on the data source, to identify a potential security risk relative to the data source or to the specific user or group of users associated to the data source when an overall potential security risk is greater than a predetermined threshold for the data source or the specific user or group of users associated to the data source, the predetermined threshold being adapted to the specific user or group of users associated to the data source and being representative of a quantity of sensitive information the specific user or group of users associated to the data source is allowed to access; and triggering remediation actions relative to the one of the specific user or group of users associated to the data source, the data source, the specific file type stored on the data source and the specific data type stored on the data source, upon detection of the potential security risk.

13. The method of claim 12, further comprising the steps of generating metadata regarding the extracted data and communicating the metadata associated to each one of the events classified as potentially threatening events to the central platform.

14. The method of claim 12, wherein the contextual and historical data includes at least one of events frequencies, a global sensitivity score for the specific user or group of users associated to the data source, a data location, behavioral patterns associated to the one of the specific user or group of users associated to the data source, the data source, the specific file type stored on the data source and the specific data type stored on the data source, a type of changes performed on a file associated to one of the events classified as potentially threatening events, a number of files associated to the specific user or group of users associated to the data source and a data type associated to the to one of the events classified as potentially threatening events.

15. The method of claim 12, wherein the step of determining the sensitivity score indicative of the level of sensitivity of the one of the data and the file associated to each one of the events classified as potentially threatening events is performed using at least one of a comparison of Term Frequency Inverse Document Frequency (TF-IDF) vectors generated for the corresponding one of the data and the file and at least one reference file and a correlation analysis between sensitive information identified with Regular Expressions (REGEXs) and user identifiers.

16. The method of claim 12, wherein the step of triggering remediation actions includes determining remediation actions based on predetermined scenarios defining the remediation actions to be taken for specific situations.

17. The method of claim 12, wherein the remediation actions include at least one of network access restriction, modification of file access rights, file encryption, user session termination, alert generation and user education recommendations.

18. The method of claim 12, further comprising generating a hash value for each version of each file stored on the data source and wherein the step of detecting the occurrence of events includes using the generated hash value to perform detection of changes in a file stored on the data source.

19. The method of claim 12, further comprising implementing corresponding remediation actions on the data source.

20. A computer-readable memory having recorded thereon statements and instructions for execution by a computer, said statements and instructions comprising code means for performing the steps of the method of claim 12.

* * * * *